United States Patent
Baumeister et al.

(10) Patent No.: US 6,369,473 B1
(45) Date of Patent: Apr. 9, 2002

(54) STATOR FOR AN ELECTRICAL MACHINE AND METHOD FOR PRODUCTION OF A STATOR

(75) Inventors: Jens Baumeister; Dieter Bauch-Panetzky, both of Schweinfurt; Peter Krause; Horst Oppitz, both of Dittelbrunn; Edmund Grau, Poppenhausen; Bernhard Schmitt, Wasserlosen; Markus van Heyden, Schweinfurt; Reinhard Sonnenburg, Münnerstadt; Martin Ochs, Walldorf; Alfred Tareilus, Schweinfurt; Jürgen Weimer, Euerbach, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/563,386

(22) Filed: May 3, 2000

(30) Foreign Application Priority Data

May 3, 1999 (DE) .......................................... 199 20 127

(51) Int. Cl.$^7$ .............................................. H02K 11/00
(52) U.S. Cl. ......................................................... 310/71
(58) Field of Search ...................... 310/71, 179, DIG. 6; 29/596, 825; 336/192

(56) References Cited

U.S. PATENT DOCUMENTS

| | | | | |
|---|---|---|---|---|
| 4,309,634 A | * | 1/1982 | Koroly et al. ............... | 310/201 |
| 4,315,179 A | * | 2/1982 | Davey ......................... | 310/184 |
| 4,321,497 A | * | 3/1982 | Long ........................... | 310/198 |
| 4,689,023 A | * | 8/1987 | Strong, III et al. .......... | 439/189 |
| 4,953,464 A | * | 9/1990 | Reiss ........................... | 102/312 |
| 5,508,571 A | | 4/1996 | Shafer, Jr. .................... | 310/71 |
| 5,825,109 A | * | 10/1998 | Jeske ........................... | 310/71 |
| 5,828,147 A | * | 10/1998 | Best et al. .................... | 310/71 |
| 6,300,697 B1 | * | 10/2001 | Findeisen et al. ............ | 310/68 B |

FOREIGN PATENT DOCUMENTS

| | | | | |
|---|---|---|---|---|
| DE | 2441175 | * | 3/1976 | |
| DE | 195 44 830 | | 6/1997 | ............ H02K/3/38 |
| DE | 196 47 559 | | 11/1997 | ............ H02K/3/28 |

* cited by examiner

*Primary Examiner*—Joseph Waks
(74) *Attorney, Agent, or Firm*—Cohen, Pontani, Lieberman & Pavane

(57) ABSTRACT

A stator for an electrical machine includes a stator yoke and a plurality of stator coils arranged on the stator yoke. An interconnection arrangement is arranged on one end face of the stator yoke. The interconnection arrangement has connecting conductors which are electrically insulated from one another. The connecting conductors are arranged concentrically with respect to one another and each have a different diameter. The connecting conductors have connections for the ends of the stator coils and for connection to the electrical machine. To minimize the space requirement of the stator and simultaneously allow the stator coils to be automatically interconnected in an automated manner, the interconnection arrangement is arranged inside an area bounded by the stator coils. Furthermore, the connections for the ends of the stator coils include connection projections designed such that they project outward at an angle to the respective connecting conductor to attach the stator coil ends. A number of cutouts are provided in the connection conductors and are arranged so that the connection projections are bendable into the cutouts once the coil ends have been connected.

17 Claims, 6 Drawing Sheets

STATOR FOR AN ELECTRICAL MACHINE AND METHOD FOR PRODUCTION OF A STATOR

BACKGROUND OF THE INVENTION

1. Field of the Invention

The present invention relates to a stator for an electrical machine including a plurality of stator coils arranged on a stator yoke and an interconnection arrangement arranged on one end face of the stator yoke having connecting conductors which are electrically insulated from one another and arranged concentrically with respect to one another. Each connecting conductor has a different diameter. The connecting conductors have connections for connection to the ends of the stator coils and for connection to the electrical machine. The present invention also relates to a method for producing such a stator.

2. Description of the Related Art

Stators for electrical machines generally have a plurality of stator teeth on which stator coils are wound. The coils are associated with individual phases of electrical power. The coils associated with a common phase are interconnected. In a three-phase machine the stator has three phases. Each of the phases have current applied to them separated by phase angles of 120°. The current input and the current output from the individual coils are passed out of the electrical machine at one stator end.

In known stators, the individual coils are interconnected by hand. In doing so, the individual coil ends of each coil were routed to the respective connections for connection to the electrical machine and electrically connected there. However, this type of interconnection has a number of disadvantages. For example, the separate interconnection of the individual coils to the corresponding connections for connection to the electrical machine results in thick cable harnesses which add to the space requirements of the electric machine. Space requirements are becoming more important in many applications. For example, a stator of the above-described type intended to be used in a vehicle is limited to the amount of area available in the engine compartment. Accordingly, efforts are being made to design individual components used in the engine compartment to be as small and space-saving as possible.

Furthermore, the known method of connecting individual coils requires that the individual wires of the coil ends be carefully insulated from one another. This requirement necessitates the use of additional insulation material and thus leads to a further increase in the required physical space. Finally, there is also a risk that faults can occur when the coil ends are being associated and correspondingly interconnected. Owing to the large number of wires, it is difficult to determine when a coil has been incorrectly connected, and when this situation occurs, which of the coils has been incorrectly connected. If a short circuit occurs in the interconnection arrangement, it is difficult and time consuming to locate the defect point.

Furthermore, the known interconnection arrangement is also highly costly, since the interconnection process must be carried out by hand. Automation of the process for production of such interconnection arrangements is impossible, so that the known interconnection arrangements are not suitable for large-scale production.

A known stator for electrical machines is disclosed in the preamble of claim 1 in the German reference DE 195 44 830 A1. In this stator, there is no individual interconnection of the respective coils to the connections for connection to the electrical machine. Instead, connecting conductors designed as ring conductors are proposed which are electrically insulated from one another and are arranged concentrically in an insulating slot structure and with a different diameter. The individual coil ends are connected via projections to the connecting conductors, with the projections projecting out of the interconnection arrangement body. This known stator avoids the complex individual interconnection of the individual coils, but this stator also has a number of disadvantages.

For example, this stator as well requires a relatively large amount of area because the interconnection arrangement is arranged in front of the coils in the axial direction. Furthermore, the projections provided for connection of the coil ends to the connecting conductors are aligned in a rigid manner at right angles to the connecting conductors which increases the area requirement for the interconnection arrangement and thus for the entire stator.

Another electrical machine having a stator provided with coils and connecting elements in the form of a ring provided for interconnection of the coils is disclosed in German reference DE 196 47 559 A1. These connecting elements designed in the form of a ring are arranged radially or axially adjacent and are electrically insulated from one another. The connection of the individual coil ends to the connecting conductors is made via openings formed in the conductors. The coil ends are passed through the openings and are then attached. This solution also still requires a relatively large amount of area, since the interconnection arrangement is once again arranged in front of the coils in the axial direction.

SUMMARY OF THE INVENTION

It is an object of the present invention to provide a stator for an electrical machine that avoids the problems of the prior art. More specifically, it is an object of the present invention to provide a stator for an electrical machine, in which the production of the individual components and the process of interconnecting the coils may be automated and carried out cost-effectively. Furthermore, the stator is intended to be designed to be particularly space-saving. In particular, the losses which occur in the stator are also intended to be minimized. Furthermore, an appropriately improved method for producing a stator is intended to be provided.

The object of the present invention is achieved by a stator comprising an interconnection arrangement arranged radially inside an area bounded by the stator coils. The connections for the ends of the stator coils comprise connection projections designed such that they project outward to attach the stator coil ends at an angle to the respective connecting conductor. Furthermore, a plurality of cutouts are provided in the interconnection arrangement for the connection projections, into which cutouts the connection projections may be bent or are bent.

The stator according to the present invention allows automatic production of the interconnection arrangement in a simple and cost-effective manner and allows automatic interconnection of the individual coils. At the same time, the area required for the interconnection arrangement, and thus for the entire stator, is considerably reduced compared to the prior art.

A fundamental idea of the present invention is that the stator coils are first fitted to the stator yoke. The connecting conductors are then introduced into the area which is bounded by the stator coils. The connecting conductors have a diameter which is smaller than the diameter of the surface bounded by the coils. Accordingly, the individual connecting conductors are no longer located axially in front of the coils, or their end windings, as has been described with respect to the known solutions. In fact, the connecting conductors are now arranged coaxially with respect to the stator coils, underneath or inside them. The individual connecting conductors preferably have a width which is matched to the end windings of the individual coils, so that the connecting conductors do not project beyond the coils, either in the axial or in the radial direction. The stator thus has a width which is governed only by the coil geometry.

The ends of each of the coils are attached to the connection projections on the connecting conductors. To accommodate this connection, the connection projections are designed such that they initially project at an angle, preferably at an angle of 90°, to the respective connecting conductor. This enables a simple connection of the coil ends to the connection projections.

Once the coil ends have been attached, the connection projections are bent into appropriate cutouts provided in the connecting conductors. In consequence, the axial space occupied by the projecting connection projections is not required after the coil ends have been connected to the connecting conductors.

In principle, the present invention is not limited to specific connecting conductor cross sections. However, it has been found to be particularly advantageous to design the individual connecting conductors with a quadrilateral conductor cross section. This design allows the individual connecting conductors to be pushed into one another in a simple and accurate manner.

Depending on the current conducting requirement, the connections for connection to the electrical machine may be in the form of plugs, sleeves, plug pins, cable lugs or other electrical connections. However, the invention is not limited to the cited examples of electrical connections, so that other embodiments for the electrical connections are also conceivable and possible.

The individual components of the stator according to the present invention may be produced in a simple and cost-effective manner. The individual coils may then be interconnected by an automated process. Furthermore, the particularly advantageous arrangement of the interconnection arrangement inside the area bounded by the stator coils allows the stator to be configured in a particularly space-saving manner. Finally, the configuration of the stator according to the invention, in particular the choice of the cross sections for the connecting conductors, also minimizes any possible resistive heat losses.

The stator may be used for every possible form of electrical machine. Electrical machines in which the stator of the present invention may be installed include, but are not limited to, for example, synchronous machines and especially synchronous machines with permanent-magnet excitation. One machine which is particularly worthy of mention is, for example, the starter generator for vehicles. This is an electrical machine whose rotors are borne via the crankshaft bearing of the internal combustion engine. The starter generator is used not only for starting and stopping the internal combustion engine, but may also carry out various functions during operation of the engine, such as braking functions, booster functions, battery management, active oscillation damping, synchronization of the internal combustion engine, and other functions. The starter generator may comprise an external-rotor synchronous machine and may be connected to the engine block of the internal combustion engine via a stator support as a supporting element.

The connection projections are advantageously arranged in the region of the stator coil ends. This allows the distances between the connection projections and the stator coil ends to be particularly short. This arrangement also prevents faults in the interconnection of the coils of one phase. The coils are interconnected in a clear manner, so that any possible defect in the interconnection of the coils may be easily identified.

An insulating layer is preferably provided between each of the connecting conductors. The insulating layer may advantageously be very thin and may, for example, comprise insulating paper, insulating film or other insulating material. The insulating layer may be loosely arranged between the individual connecting conductors, bonded to the connecting conductors, or fitted between the connecting conductors in some other way. The invention is not limited to specific embodiment forms of the insulating layer or to specific insulating materials.

In a further refinement, the interconnection arrangement may be arranged above an insulating layer on the stator yoke. This insulating layer may, for example, comprise an insulating disk or the like.

The stator coil ends are advantageously connected to the connection projections via a jointed connection and/or a mechanical connection. For example, the coil ends may be soldered to the connection projections using, for example, a soldering or brazing process. It is also conceivable for the coil ends to be welded to the connection projections. Preferred welding processes include resistance welding, laser welding, or ultrasound welding. However, any other welding may also be used. The mechanical connections used may be, for example, crimped connections. However any other mechanical connection for effecting the connection may also be used.

The connections for connection to the electrical machine are preferably each passed from the radial inside of the stator yoke between two adjacent stator coils to the radial outer side of the stator yoke. To do this, the connections may be passed radially outward through the gaps that exist between two adjacent stator coils, leading to a further reduction in the axial physical space.

Each of the connecting conductors are preferably produced from a strip material. This allows the connecting conductors to be produced by an automated process which is particularly easy and cost-effective. The individual connecting conductors may be produced from any suitably conductive material such as copper and may be rolled by a suitable rolling process and wound to form coils. The connection projections, and the cutouts required in the connecting conductors, may be incorporated in the connecting conductors by any suitable method such as, for example, stamping methods, cutting methods or other machining processes.

In a further refinement, one or more of the connecting conductors may have one or more cutouts for the connections to pass through for connection to the electrical machine. Such cutouts are physically necessary since the connecting conductors are arranged radially one above the other, and electrically necessary to prevent electrical contact between the connections and the respective adjacent connecting conductors.

The interconnection arrangement may preferably have three connecting conductors for a three-phase machine.

The number of connecting conductors depends on the application and the embodiment of the stator. In the same way, the number of stator coils used may vary for different stator application areas. Since each of the stator coils is connected via two connection projections to appropriate connecting conductors, the number of connection projections and the number of cutouts for the connection projections may be varied as required when the number of stator coils varies.

The connecting conductors may advantageously be designed in the form of a ring or in the form of a ring segment. This allows the connecting conductors to be matched particularly advantageously to the geometry of the stator and to the arrangement geometry of the stator coils.

According to one preferred embodiment of the stator according to the invention, the connecting conductors are designed as closed ring structures. The end regions of the ring structures are designed as respective connections for connection to the electrical machine. In this embodiment, the individual connecting conductors are produced first of all as strip material and then cut to the required length. After this, the connecting conductors (which are initially in the form of flat strips) are bent to form ring structures with the required diameter. The end regions of the ring segments may then be bent at a desired angle, for example at right angles to the connecting conductor, and thus form a respective connection for connection to the electrical machine. Those end regions which are designed as a connection may advantageously be connected to one another using a suitable joining process, for example, which increases the robustness of the annular connecting conductor.

According to another embodiment of the invention, the connecting conductors may be designed as open ring structures, in which case the individual ring structures may each have a different length. In this embodiment, one of the end regions of a respective ring structure may be designed as a connection for connection to the electrical machine. Such a refinement of the individual connecting elements further simplifies the production. The configuration as an open ring structure and the fact that the individual connecting conductors have a different length eliminates the need for forming cutouts for the connections to pass through.

In yet another refinement to the invention, the connecting conductors may be designed as closed rings, with the connections for connection to the electrical machine each being arranged on the rings. The connections may each be arranged in an appropriate cutout in the connecting conductors. In this embodiment, the respective connections are not required to be formed as specially designed end regions of the connecting conductors. In fact, individual connecting conductors may be produced first of all in the form of closed rings, with the connections then being attached to the connecting conductors. The connections are advantageously once again arranged in appropriately designed cutouts on the connecting conductors. This once again makes it possible for the connections to be passed between the respective adjacent connecting conductors without any possibility of electrical contact between the connections and the respective adjacent connecting conductors.

Each of the stator coils advantageously comprises an end winding and an insulating body and is produced using an individual tooth winding technique. This production technique allows the coils to be wound automatically on the respective teeth. After winding, the individual coil produced in this way is then connected to the stator yoke.

The interconnection arrangement may advantageously be arranged via a jointed connection and/or a mechanical connection on the stator yoke or on the insulating body of the stator coils. This arrangement of the interconnection arrangement must be adopted owing to the natural weight of the interconnection arrangement and the oscillations which occur in the electrical machine. The fixing of the interconnection arrangement is necessary since, otherwise, the coil ends could tear off or be damaged. The interconnection arrangement, and the connecting conductors of the circuit arrangement, may advantageously be arranged on the stator yoke or on the insulating bodies of the stator coils via a clip or by some other type of mechanical attachment such as, for example, screwing, riveting, welding. The connection of the interconnection arrangement to the stator yoke and/or the insulating bodies of the stator coils is not limited to the above listed connections and may be effected by any mechanical connection.

In a further refinement, the stator may be impregnated. This results in a particularly solid structure. The stator, and the individual components of the stator, may, for example, be encased by a high-temperature cast resin, which is electrically insulating and assists thermal conduction to dissipate the heat losses released in the stator coils.

According to the present invention, a method for producing a stator according to the present invention, as described above, is distinguished according to the present invention by the following steps:

a) fitting the stator coils to the stator yoke;

b) introducing the interconnection arrangement which comprises a plurality of connecting conductors which are insulated from one another into an area which is bounded by the stator coils, so that the interconnection arrangement does not project either in the axial direction or in the radial direction beyond the end windings of the stator coils;

c) attaching the stator coil ends to the connection projections of the plural connecting conductors; and d) bending of the connection projections into the cutouts provided for receiving the connecting conductors.

The method according to the present invention allows simple, cost-effective interconnection of the individual stator coils to the connection conductors which may be automated. The advantages, influences, effects and method of operation of the method according to the invention is described above in the discussion of the stator according to the present invention.

The stator coils are advantageously produced using the individual -tooth winding technique.

In a further refinement, the connecting conductors of the interconnection arrangement are initially produced as strip material and are then cut to the desired length.

In a further refinement, the stator coil ends are attached to the connection projections via a jointed connection and/or a mechanical connection.

The connections for connection of the connection conductors to the electrical machine are preferably each passed through between two adjacent stator coils.

The stator may advantageously subsequently be impregnated.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
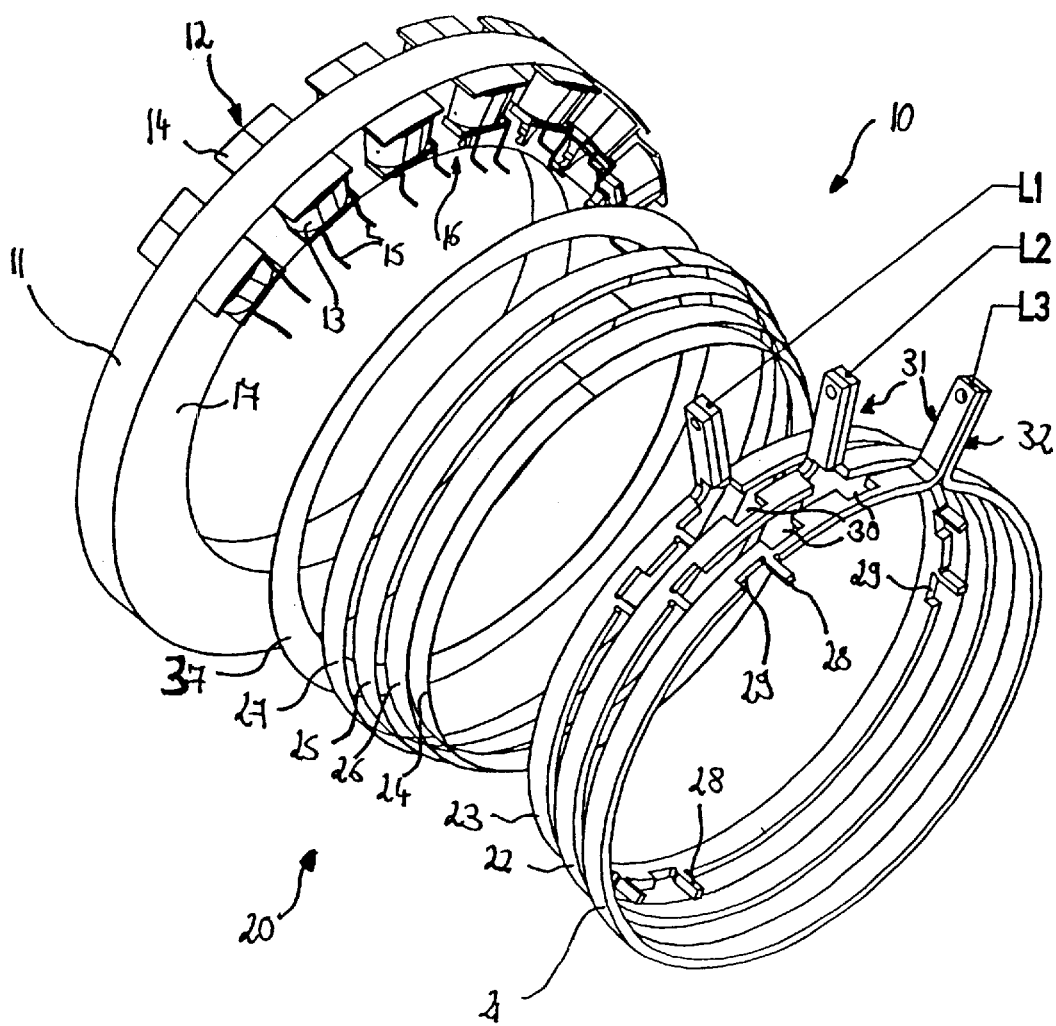
FIG. 1 is perspective exploded view of a first embodiment of the stator according to the present invention.
Figure 2:
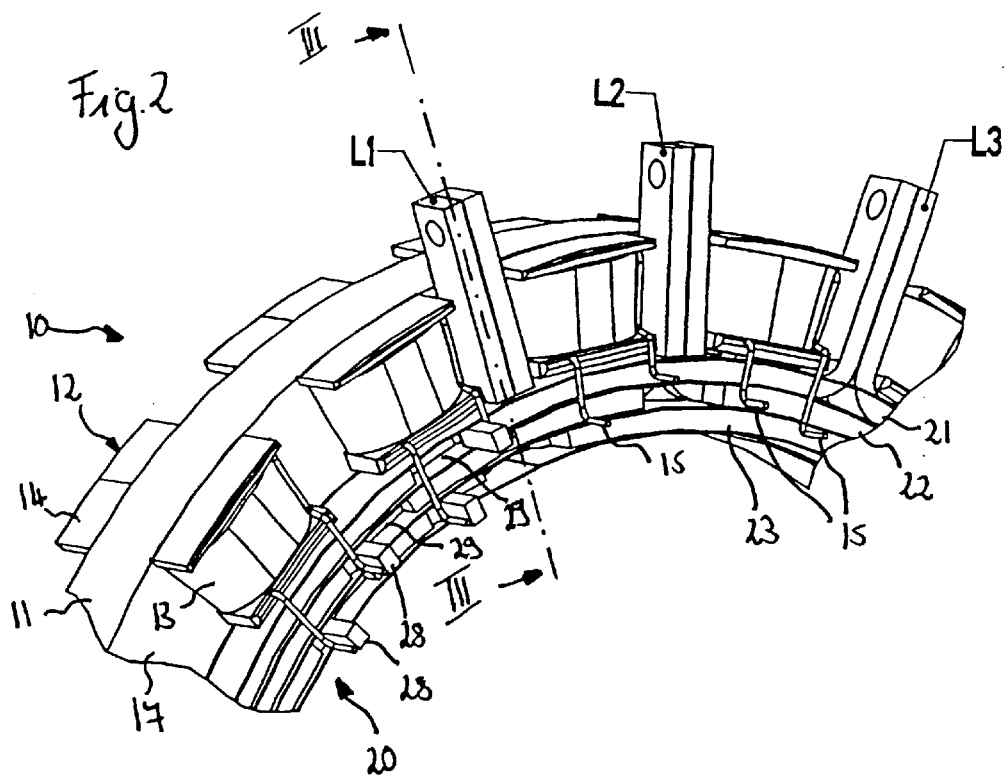
FIG. 2 is a perspective view of a portion of the stator from FIG. 1 in an assembled state.
Figure 3:
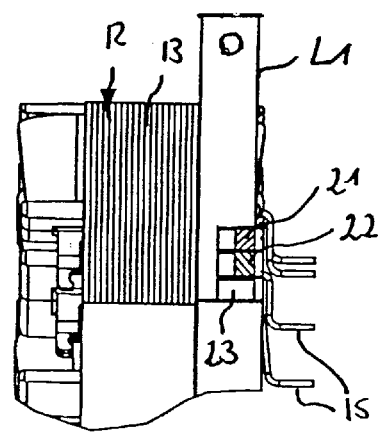
FIG. 3 is a cross-sectional view through the stator along the section line III—III in FIG. 2.

FIGS. 1 to 3 show a first embodiment of a stator 10 which is designed for use as a stator for an electrical machine. The present invention is particularly designed for use with a synchronous machine with permanent-magnet excitation such as a starter generator for a motor vehicle.

The stator 10 has a stator yoke 11 on which a plurality of stator coils 12 are arranged. The stator coils 12 each have an end winding 13 and an insulating body 14. The ends of the stator coil windings 13 are each formed by stator coil ends 15. The stator coils 12 are arranged around a circumference on the stator yoke 11 and thus form an area 16 bounded by the stator coils. This area 16 has a diameter formed by the distances between the stator coils 12 and the diameter of the stator yoke 11. The height of the area 16 results from the end windings 13 of the stator coils 12, that is to say from those regions of the end windings 13 which project beyond the stator yoke 11.

An interconnection arrangement 20 is provided on one end face 17 of the stator yoke 11. The interconnection arrangement 20 has three connecting conductors 21, 22, 23, which are each designed as a closed ring structure 31. Although three connecting conductors are shown, more or less than three connecting conductors could also be used depending on the particular application in which the stator 10 is used. The connecting conductors 21, 22, 23 are produced from a strip material comprising a conductive material such as, for example, copper and each have a different diameter. When the stator 10 is in the assembled state, as shown in FIG. 2, the connecting conductors 21, 22, 23 are designed to be concentric with respect to one another and are thus arranged radially one above the other. Insulating layers 24, 25, 26, 27 are provided between each of the individual connecting conductors 21, 22, 23 and on the radial outer and radial inner side of the entire interconnection arrangement. In the present exemplary embodiment, the insulating layers comprise insulating paper. The insulating layers prevent any electrical contact between the individual connecting conductors 21, 22, 23. Furthermore, the individual connecting conductors 21, 22, 23 are attached to the end face 17 of the stator yoke 11 via an insulating layer 37 in the form of an insulating disk.

The connecting conductors 21, 22, 23 comprise a plurality of connection projections 28 for connection of the stator coil ends 15 to respective connecting conductors 21, 22, 23. The number of connection projections 28 depends on the number of stator coils 12 arranged on the stator yoke 11. Each stator coil end 15 is attached to one of the connection projections 28 in a suitable manner such as, for example, by a soldered or welded connection.

In FIGS. 1 to 3, the connection projections 28 to this end initially project at an angle, preferably at right angles, from the respective connecting conductors 21, 22, 23 to facilitate the connection to the coil ends 15. To minimize the space required by the stator 10, cutouts 29 are provided in the region of the connection projections 28 in the connecting conductors 21, 22, 23. The connection projections 28 may be bent so that they are received in the cutouts 29 after being connected to the stator coil ends 15.

The end regions 32 of the connecting conductors 21, 22, 23 which are designed as closed ring structures 31, are designed as connections L1, L2, L3 for connection to an electrical machine, which is not shown. The end regions 32 are bent up, i.e., radially outward, in an appropriate manner for this purpose.

To prevent any electrical contact between the connections L1, L2, L3 and the respective adjacent connecting conductors 21, 22, 23, appropriate cutouts 30 are also provided in the connecting conductors 21, 22, 23. The connections of the respective adjacent connecting conductors are passed through this cutout 30 in each connecting conductor, without any electrical contact being possible.

The individual end regions 32 of the connecting conductors 21, 22, 23 which are designed as a closed ring structure 31, are bent in such a way that the end regions 32 can be passed radially outward, in their function as connections L1, L2, L3, through gaps between two respective adjacent stator coils 12, for connection to the electrical machine.

The stator 10 designed according to the invention may thus be produced in a particularly space-saving manner.

A method for production of such the stator 10 will now be described. First of all, the individual stator coils 12 are automatically wound onto individual teeth using a suitable production method such as, for example, using the individual tooth winding technique. The stators coils 12 wound in this way are then fitted to the stator yoke 11.

The individual connecting conductors 21, 22, 23 may be produced as strip material, using a suitable method. The individual cutouts 29, 30 and the connection projections 28 are then formed in the strip material. The strips are cut to the respective desired lengths and then bent to form closed ring structures 31. After this, their end regions 32 are bent such that they form the connections L1, L2, L3 for connection to the electrical machine.

The connecting conductors 21, 22, 23, which are designed as closed ring structures 31, are pushed together. The diameters differ so that the connecting conductors 21, 22, 23 are concentrically arranged one above the other in the radial direction after they are pushed together. Appropriate insulating layers 24, 25, 26, 27 are fitted between the individual connecting conductors 21, 22, 23. The interconnection arrangement 20 formed in this way is pushed under the end windings 13 of the stator coils 12 and against one end face 17 of the stator yoke 11. In the process, the configuration of the interconnection arrangement 20 according to the invention results in the individual connecting conductors 21, 22, 23 projecting neither in the axial direction nor in the radial direction beyond the end windings 13 of the stator coils 12. The connections L1, L2, L3 are passed radially outward through the gaps between two adjacent stator coils 12.

The coil ends 15 are then attached to the connection projections 28, which may be done, for example, using a soldering or welding method. After this connection of the coil ends 15, the connection projections 28 are bent into the cutouts 29. Accordingly, once the coil ends 15 have been connected, there is no need for any more axial physical space used by the projecting connection projections 28.

The stator 10 manufactured in this way can be impregnated in a subsequent method step, resulting in a solid structure.

Figure 4:
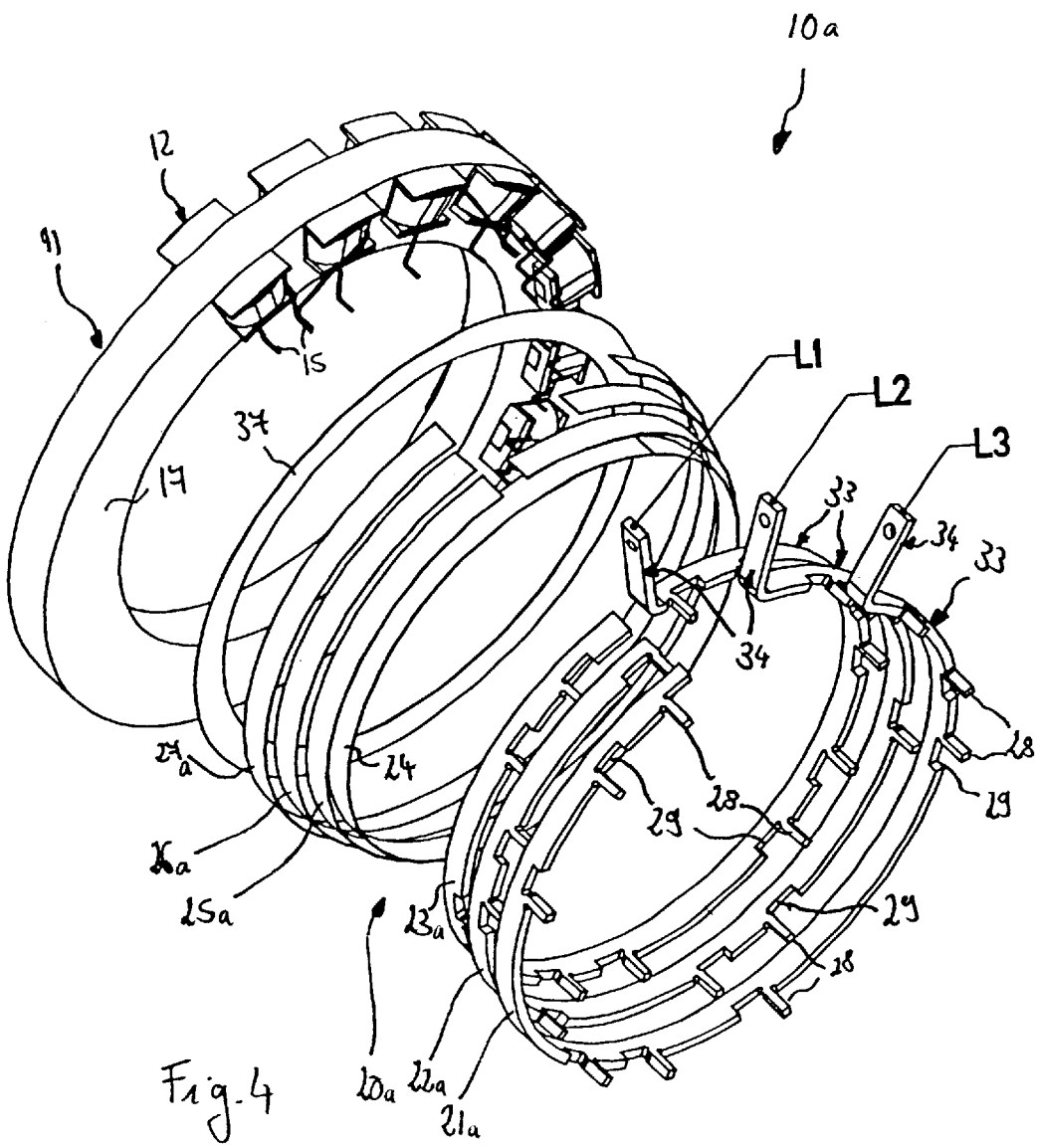
FIG. 4 is a perspective exploded view of a further embodiment of the stator according to the present invention.
Figure 5:
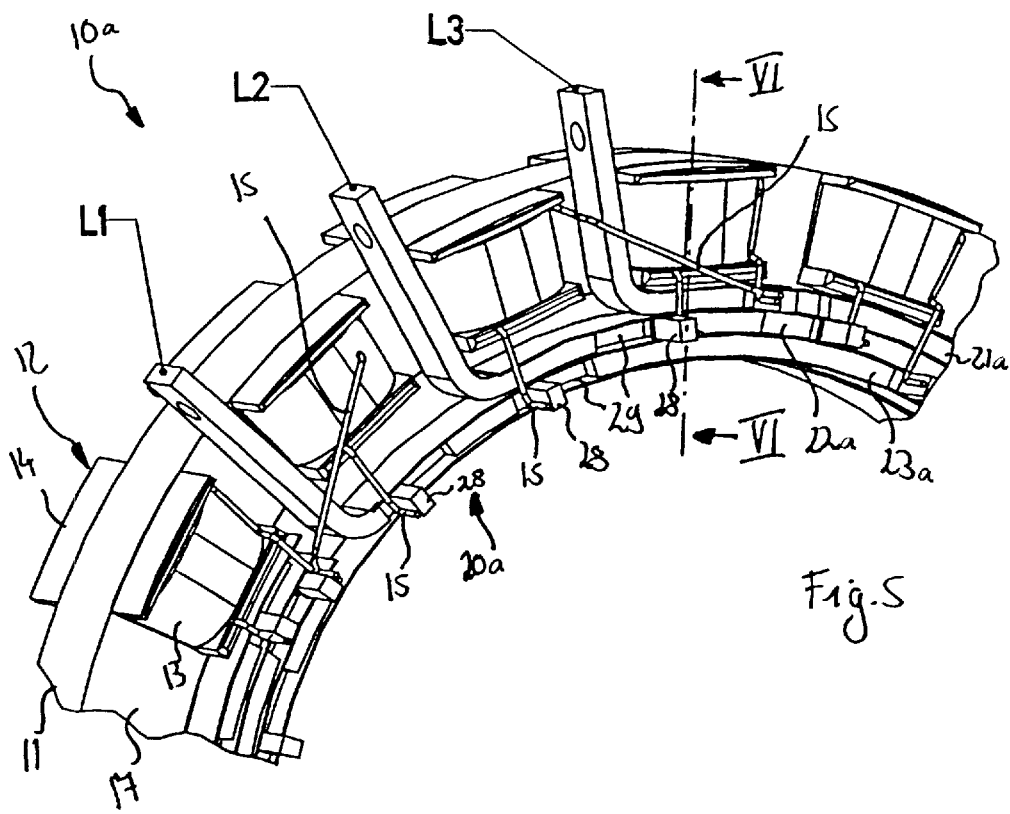
FIG. 5 is a perspective view of a portion of the stator from FIG. 4 in an assembled state.
Figure 6:
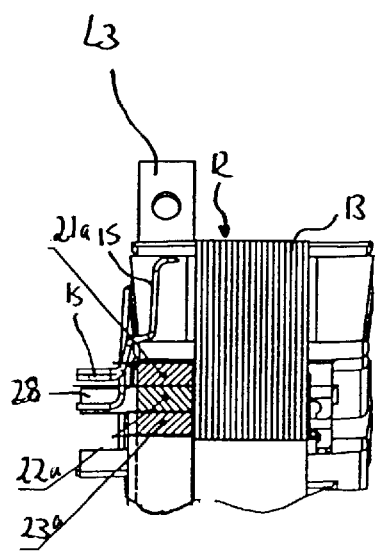
FIG. 6 is a cross-sectional view through the stator along the section line VI—VI in FIG. 5.

FIGS. 4 to 6 show a further embodiment of the stator 10a according to the invention. In this case, those components which are physically identical to the corresponding components in the embodiment shown in FIGS. 1 to 3 are denoted by identical reference numbers.

The stator 10a illustrated in FIGS. 4 to 6 is constructed in an essentially identical manner to the stator 10 described with reference to FIGS. 1 to 3 so that, to avoid repetition, the stator yoke 11 and the coils 12 will not be described in detail.

In contrast to the exemplary embodiment shown in FIGS. 1 to 3, the interconnection arrangement 20a illustrated in FIGS. 4 to 6 has connecting conductors 21a, 22a, 23a which are designed in the form of an open ring structure 33. The individual connecting conductors 21a, 22a, 23a once again have a number of connection projections 28 and cutouts 29, via which the stator coil ends 15 may be connected to the connecting conductors 21a, 22a, 23a in the manner which has already been described in detail further above.

Designing the individual connecting conductors 21a, 22a, 23a as open ring structures 33 has the advantage that there is no need to form special cutouts for the connections L1, L2, L3 to pass through. The individual connecting conductors 21a, 22a, 23a once again each have different diameters. In addition to this, this embodiment provides for the connecting conductors 21a, 22a, 23a to have different lengths as well. If the connecting conductors 21a, 22a, 23a are now bent to form rings, the different lengths of the individual connecting conductors result in free spaces which carry out the function of cutouts and through which the connections L1, L2, L3 of the respective adjacent connecting conductors may be passed.

As can be seen from FIGS. 4 to 6, the coil ends 15 are not always required to be connected to appropriate connection projections 28 by the shortest route. In fact, even in an embodiment such as this, the length of the coil ends 15 to be interconnected is still sufficiently short to ensure that the coils 12 are interconnected in a clear manner.

Figure 7:
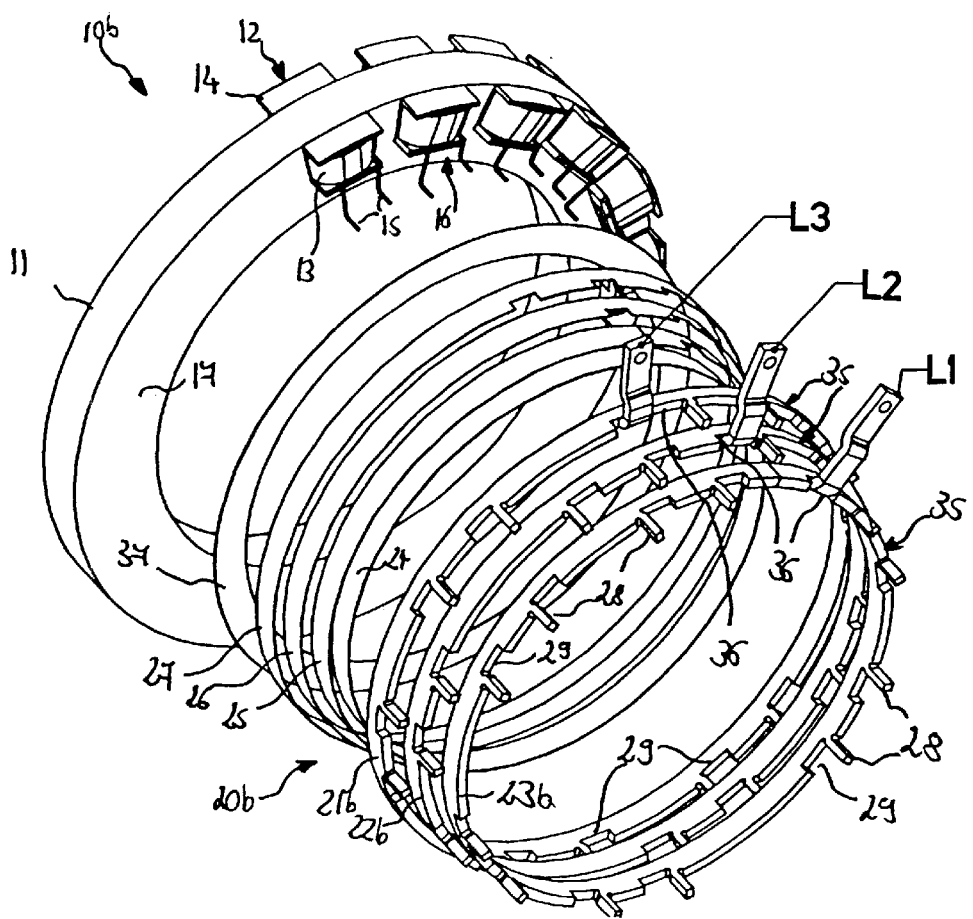
FIG. 7 is a perspective exploded view of yet another embodiment of the stator according to the present invention.
Figure 8:
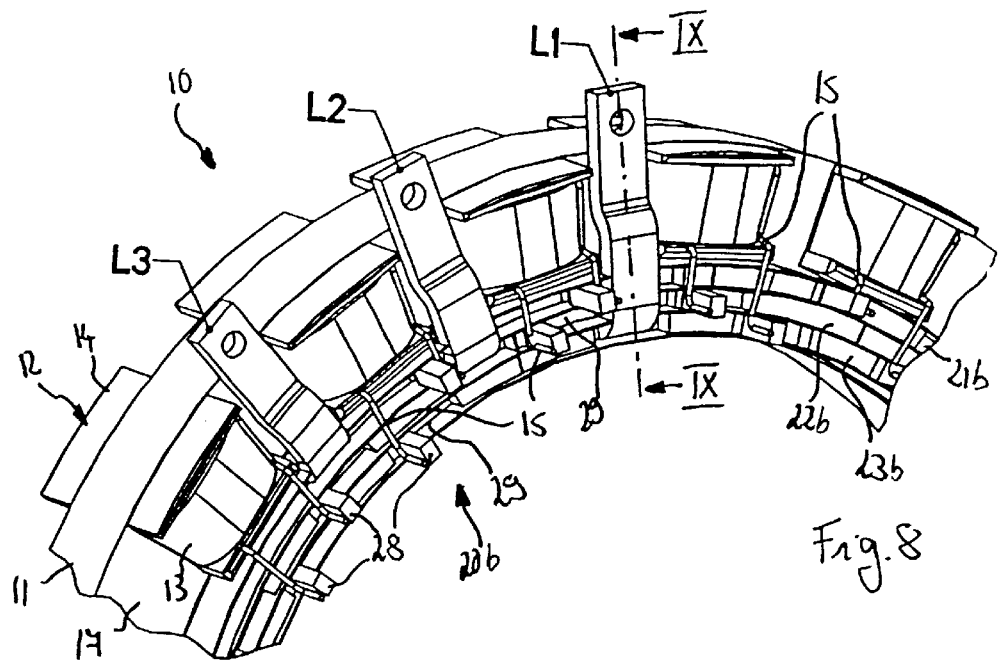
FIG. 8 is a perspective view of a portion of the stator from FIG. 7 in an assembled state.
Figure 9:
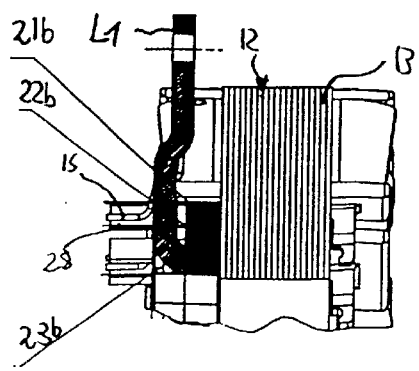
FIG. 9 is a cross-sectional view through the stator along the section line IX—IX in FIG. 8.

FIGS. 7 to 9 show yet another embodiment of the stator 10b according to the invention. Physically identical components are once again denoted by identical reference numbers.

In contrast to the exemplary embodiments illustrated in FIGS. 1 to 6, the stator 10b illustrated in FIGS. 7 to 9 has an interconnection arrangement 20b whose connecting conductors 21b, 22b, 23b are designed as closed rings 35. The closed rings 35 each have cutouts 36 in which the respective connections L1, L2, L3 for connection to an electrical machine are arranged. The individual cutouts 36 are in this case designed in such a way that the connections L1, L2, L3 can be passed through respective adjacent connecting conductors 21b, 22b, 23b without any electrical contact being made.

The use of the individual embodiments for the interconnection arrangement 20 depends on the requirement and the application. However, it is obvious that the invention is not limited to the described examples, so that other embodiments of the interconnection arrangement 20 and of the stator 10 are also possible.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A stator for an electrical machine, comprising:

a stator yoke having an axial end face;

a plurality of stator coils arranged along a circumference of said stator yoke, each of said plural stator coils having two stator coils ends; and an interconnection arrangement arranged on said axial end face of said stator yoke in an area bounded by said plural stator coils, said interconnection arrangement comprising a plurality of connecting conductors concentrically arranged with respect to each other, each of said plural connecting conductors having a different diameter and being electrically insulated from the others of said plural connecting conductors, said plural connecting conductors comprising electric machine connections for connection to the electric machine and connection projections for connection to said coil ends of said stator coils, said connection projections projecting axially outward at an angle to said connection conductors, said plural connecting conductors further comprising cutouts into which said connection projections are bendable.

2. The stator of claim 1, wherein the connection projections are formed in a region of said stator coil ends.

3. The stator of claim 1, further comprising an insulating layer arranged between each adjacent pair of the connecting conductors.

4. The stator of claim 3, further comprising an insulating layer arranged between said interconnection arrangement and said stator yoke.

5. The stator of claim 1, wherein said stator coil ends are connected to said connection projections via a connection comprising one of a jointed connection and a mechanical connection.

6. The stator of claim 1, wherein said electrical machine connections for connection to the electrical machine are each passed from a radial inner side to a radial outer side of said stator coils between two adjacent stator coils.

7. The stator of claim 1, wherein each of said connecting conductors is formed from a strip material.

8. The stator of claim 1, wherein at least one of said connecting conductors comprises a cutout for allowing one of said electric machine connections to pass through for connection to the electrical machine.

9. The stator of claim 1, wherein said interconnection arrangement comprises three connecting conductors.

10. The stator of claim 1, wherein said connecting conductors comprise one of rings and ring segments.

11. The stator of claim 1, wherein said connecting conductors comprise closed ring structures having connected end regions, wherein said end regions comprise said electric machine connections for connection to the electrical machine.

12. The stator of claim 1, wherein said connecting conductors comprise open ring structures having end regions, each of said connecting conductors having a different length, and wherein one of said end regions of each of said open ring structures comprises one of said electrical connections for connection to said electrical machine.

13. The stator of claim 1, wherein said connecting conductors comprise closed rings, said electric machine connections for connection to the electrical machine are arranged on said closed rings, and wherein said connections are each arranged in a cutout in said connecting conductors.

14. The stator of claim 1, wherein each of said stator coils comprises ah end winding and an insulating body, said each of said stator coils being formed via an individual tooth winding technique.

15. The stator of claim 14, wherein said interconnection arrangement is arranged on said insulating bodies of said stator coils via one of a jointed connection and a mechanical connection.

16. The stator of claim 1, wherein said interconnection arrangement is arranged on said stator yoke via one of a jointed connection and a mechanical connection.

17. The stator of claims 1, wherein said stator is impregnated.

* * * * *